United States Patent
Engleder et al.

(10) Patent No.: US 8,561,945 B2
(45) Date of Patent: Oct. 22, 2013

(54) SKID-TYPE LANDING GEAR FOR A HELICOPTER

(75) Inventors: Alexander Engleder, Donauworth (DE); Stefan Gorlich, Donauworth (DE)

(73) Assignee: Eurocopter Deutschland GmbH, Donauwoerth ( * ) Notice: Subject to any disclaimer, the term of this patent is extended or adjusted under 35 U.S.C. 154(b) by 412 days.

(21) Appl. No.: 13/071,333

(22) Filed: Mar. 24, 2011

(65) Prior Publication Data
US 2011/0233323 A1 Sep. 29, 2011

(30) Foreign Application Priority Data

Mar. 29, 2010 (EP) .................................. 10400021

(51) Int. Cl.
*B64C 25/32* (2006.01)
(52) U.S. Cl.
USPC ............... 244/108; 244/102 R; 244/17.17
(58) Field of Classification Search
USPC .............. 244/108, 17.17, 102 R, 100 R
See application file for complete search history.

(56) References Cited

U.S. PATENT DOCUMENTS

| 4,270,711 | A | 6/1981 | Cresap |
| 4,558,837 | A | 12/1985 | Mens |
| 5,224,669 | A * | 7/1993 | Guimbal ...................... 244/108 |
| 5,897,077 | A * | 4/1999 | Head ......................... 244/17.17 |
| 6,244,538 | B1 | 6/2001 | Howard |
| 7,770,843 | B2 * | 8/2010 | Bietenhader ................. 244/108 |
| 7,918,417 | B2 * | 4/2011 | Mouille ..................... 244/108 |
| 2012/0080560 | A1 * | 4/2012 | Piccone et al. ............. 244/108 |

FOREIGN PATENT DOCUMENTS

| EP | 0113616 A1 | 7/1984 |
| EP | 0564325 A1 | 10/1993 |
| GB | 726573 A | 3/1955 |

OTHER PUBLICATIONS

Search Report and Written Opinion; Application No. EP 10400021; dated Sep. 8, 2010.

* cited by examiner

*Primary Examiner* — Christopher P Ellis
(74) *Attorney, Agent, or Firm* — Brooks Kushman P.C.

(57) ABSTRACT

The invention relates to a skid-type landing gear (1) for a helicopter (2) comprising bow shaped crosstubes (10-13) directed symmetrically towards a left- and a right-hand side of a longitudinal mid axis (9) of the helicopter (2) with respective skids (14, 15) at outboard ends thereof and main beams (5-8) in a fuselage (4), the crosstubes (10-13) being connected to the main beams (5-8) via supports (16-23) fixed to the main beams (5-8). The skid-type landing gear (1) is retractable. A method for operating such a skid-type landing gear (1) for a helicopter (2) is provided.

8 Claims, 2 Drawing Sheets

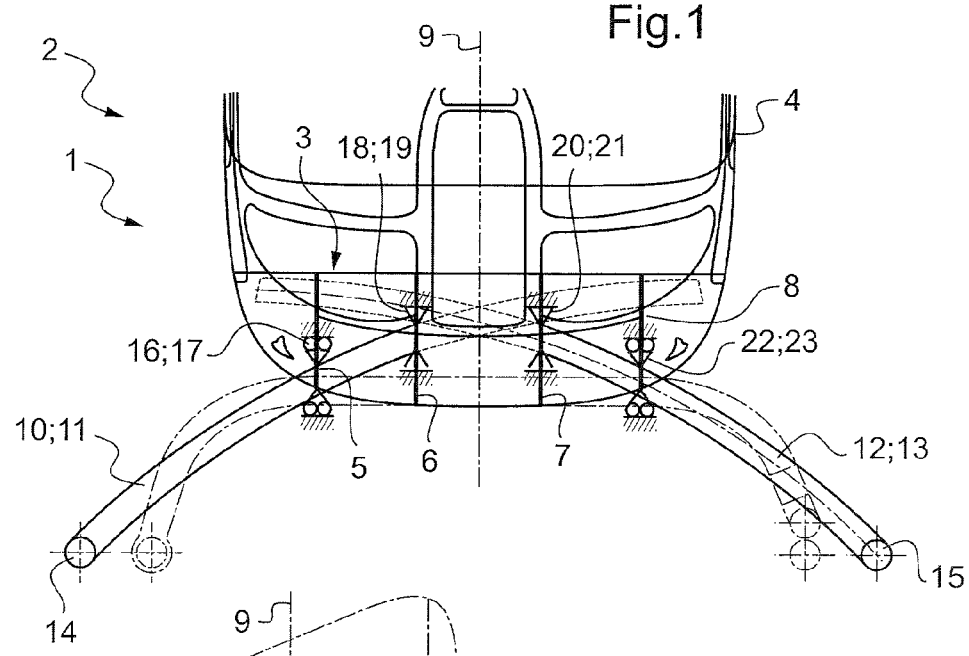
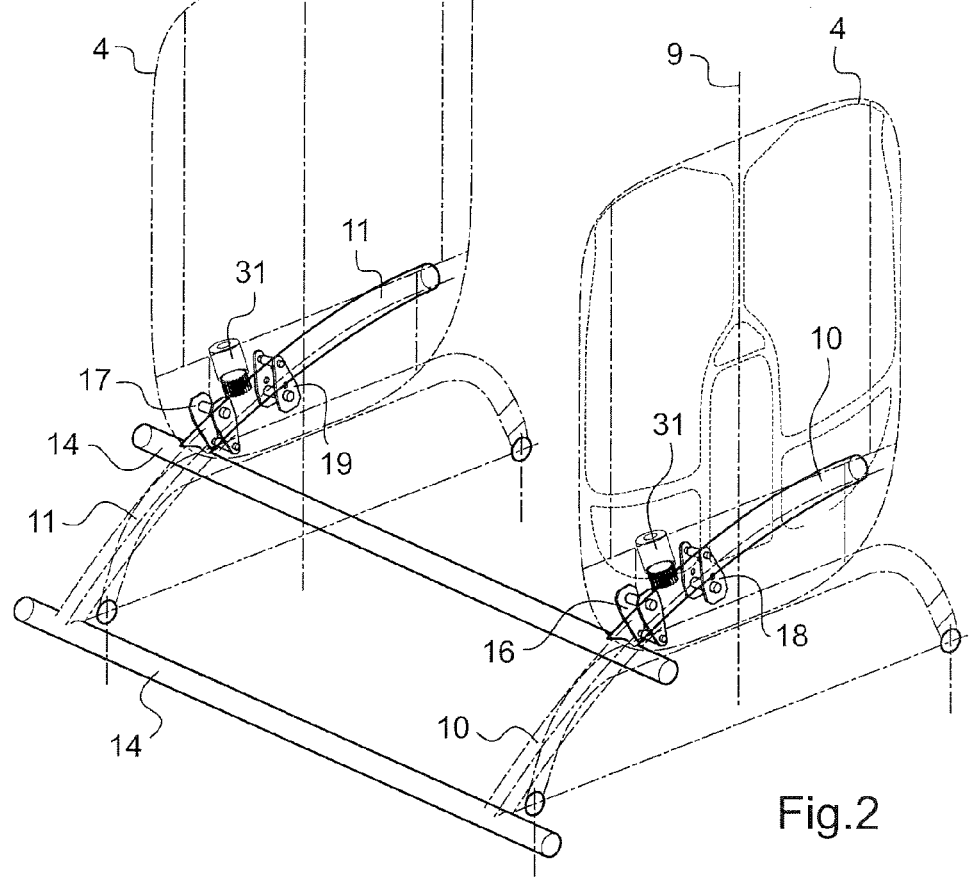

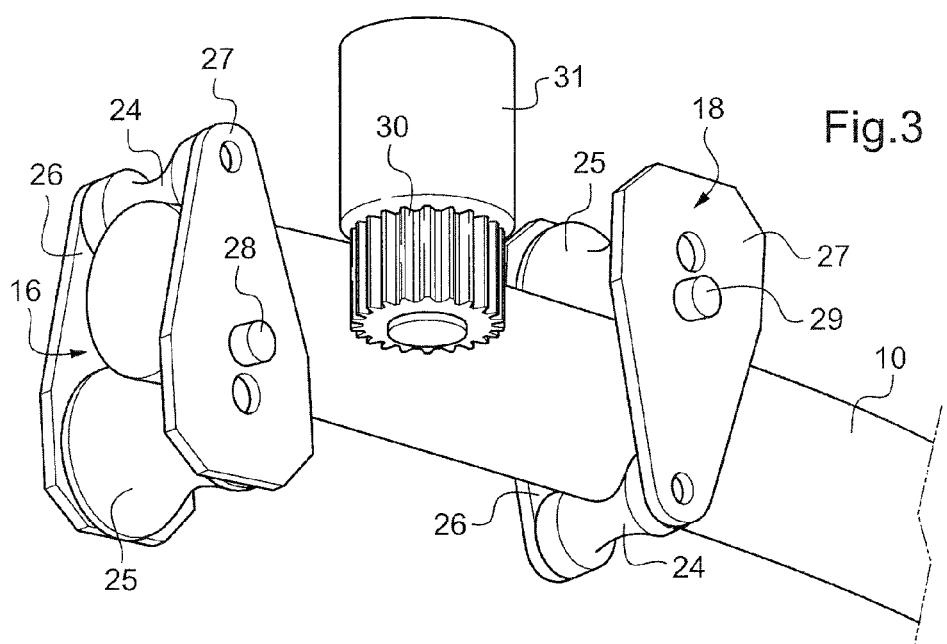
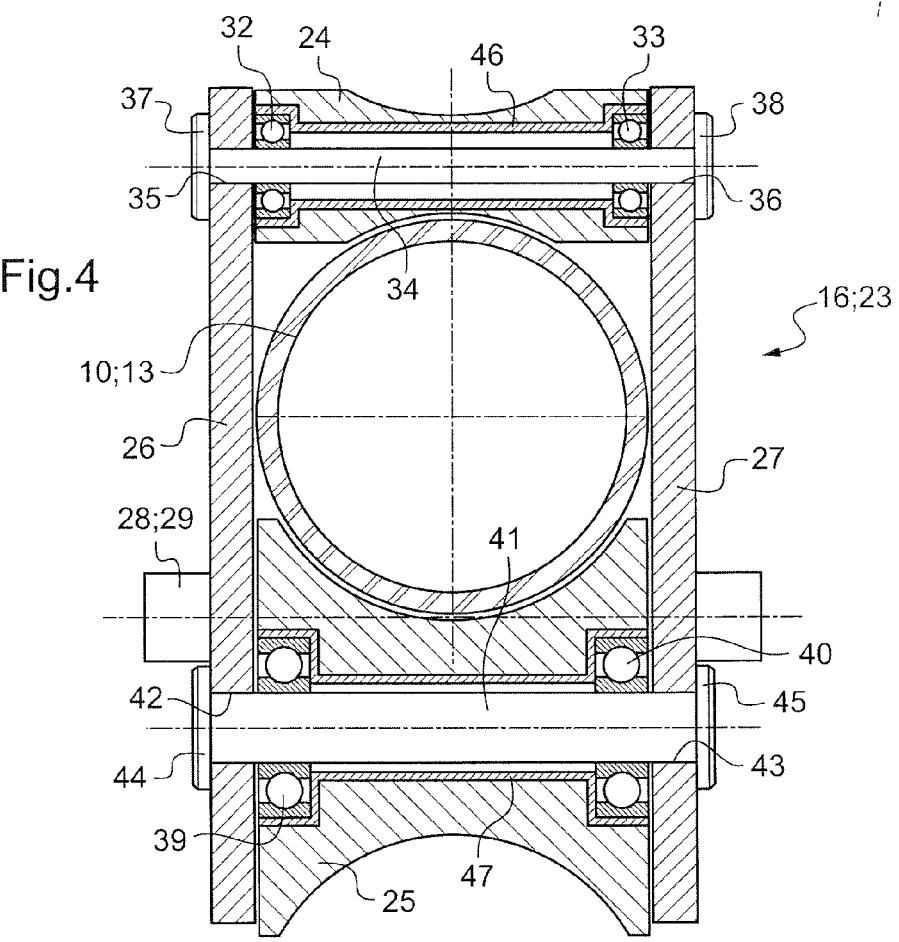

SKID-TYPE LANDING GEAR FOR A HELICOPTER

CROSS REFERENCE TO RELATED APPLICATIONS

This application claims the benefit of EP 10 400 021.1 filed on Mar. 29, 2010, the disclosure of which is incorporated in its entirety by reference herein.

BACKGROUND OF THE INVENTION (1) Field of the Invention

The invention relates to a skid-type landing gear for a helicopter and a method for operating such a skid-type landing gear for a helicopter.

(2) Description of Related Art

The helicopter Bell 209 was equipped with a retractable skid-type landing gear.

U.S. Pat. No. 4,270,711 discloses a helicopter skid-type landing gear assembly including a pair of crosstubes having a pair of struts connected at the outboard ends thereof. A first of the crosstubes is connected to the helicopter fuselage at a pair of laterally spaced points. The second of the crosstubes is joined by a pivot connection to a structural bridge positioned above the second crosstube. The structural bridge is connected at its outer ends to the fuselage main beams. The structural bridge connected to the second crosstube permits the helicopter fuselage to pivot about a fore-aft axis thereof to lower the natural roll frequency of the helicopter airframe and therefore increase the margin of stability to prevent ground resonance.

EP 0564325 A1 relates to a retractable landing gear for a helicopter including a damping leg mounted so as to pivot, as well as an associated operating jack. The leg is produced in two elements which are articulated together around a shaft parallel to the axis of pivoting of the leg and are linked by a damper, the lower element forming a bell crank, and the upper element forming a panel whose free end is linked to an operating jack which is a damping jack with a force threshold, the said damping jack serving to apply the predetermined torque keeping the leg in its position during a normal landing, while allowing this leg to be retracted with a controlled force in the event of a crash landing.

Skid-type landing gears of helicopters according to the state of the art contribute considerably to the total air drag of a helicopter. During fast forward flight of a helicopter about 20% of the total air drag is contributed by the skid-type landing gears. An important amount of fuel has to be consumed during missions with a high cruising share to overcome this air drag with this extra amount of fuel adding to the costs of the mission and adding to the weight of the helicopter thus limiting the operational range of the helicopter.

SUMMARY OF THE INVENTION

It is an object of the present invention to provide a skid-type landing gear for a helicopter with reduced air drag during cruising of the helicopter.

The solution is provided with a skid-type landing gear for a helicopter with the features of claim 1 and a method for operating such a skid-type landing gear for a helicopter with the features of claim 7.

According to the invention a skid-type landing gear for a helicopter, particularly a light and middle weight helicopter, comprises at least two bow shaped crosstubes directed symmetrically towards a left- and a right-hand side of a longitudinal axis of the helicopter with respective skids at outboard ends thereof and main beams in a fuselage of the helicopter. The crosstubes are connected to the main beams via laterally spaced supports fixed to the main beams. At least one crosstube is provided separately for each side of the helicopter with the crosstubes on either side being slidably mounted relative to the supports. At least one drive is provided for moving the at least one crosstube per side relative to the supports between a retracted and an extended position. The supports are supporting the skid-type landing gear vertically and horizontally while allowing predetermined movements along a longitudinal axis of the respective crosstubes. Preferably the longitudinal movements of the crosstubes opposed to one another relative to the longitudinal axis of the helicopter are symmetrical with respect to the longitudinal axis of the helicopter. The advantages of the invention with respect to fuel savings at cruising operation with skids retracted to a position aligned to the fuselage of the helicopter reach up to 20% of the overall fuel consumption of the helicopter. The reduced need for fuel contributes to a lower operational weight of the helicopter with the following advantages for manoeuvrability of the helicopter.

According to a preferred embodiment of the invention the crosstubes have a circular bow shape for kinematically simple conveyance between the retracted and the extended position.

According to a further preferred embodiment of the invention the supports comprise rollers mounted in casings of the supports for low friction conveyance of the crosstubes.

According to a further preferred embodiment of the invention the drive comprises an electric or hydraulic motor for efficient retraction of the skid-type landing gear from an extended position towards the fuselage and vice versa.

According to a further preferred embodiment of the invention the drive comprises a motor-gears unit with a pinion interacting with a rack mounted on each of the crosstubes for reliable mechanical connection of the drive to the respective crosstube.

According to a further preferred embodiment of the invention the crosstubes are provided with a mechanical lock for each of the crosstubes to keep the gear extended in the extended position.

According to a preferred embodiment of the invention a method of operating a skid-type landing gear comprises the steps of retracting the at least two bow shaped crosstubes with the respective skids at outboard ends thereof after take-off from a landing position to a flight position and vice versa.

BRIEF DESCRIPTION OF THE DRAWINGS

According to a further preferred embodiment of the invention the crosstubes are locked in a landing position, preferably before landing.

A preferred embodiment of the invention is presented in the attached drawings.

FIG. 1 shows schematically a front view of a helicopter with a skid-type landing gear according to the invention, FIG. 2 shows a view in perspective to an enlarged part of FIG. 1, FIG. 3 shows schematically an enlarged view of a part of the skid-type landing gear according to the invention, and FIG. 4 shows a cross sectional view of one of the supports of the skid-type landing gear according to the invention.

DETAILED DESCRIPTION OF THE PREFERRED EMBODIMENTS

FIG. 1, 2: A skid-type landing gear 1 is mounted to a bottom structure 3 of a fuselage 4 of a helicopter 2, particularly a light and middle weight helicopter. The bottom structure 3 in the fuselage 4 comprises four vertically oriented longitudinal main beams 5-8 symmetrically arranged to a longitudinal mid-axis 9 of the helicopter 2 with the main beam 5 being about 0.5 m and the main beam 6 about 0.195 m offset from the longitudinal mid.axis 9. Four separate bow shaped crosstubes 10-13 of cantilever type are provided with skids 14, 15 at their respective outboard ends. The crosstubes 10, 11 are opposed to the crosstubes 12, 13 with respect to the longitudinal mid-axis 9 such that the crosstubes 10-13 with the skids 14, 15 are essentially symmetrically arranged to the longitudinal mid.axis 9. The left-hand crosstubes 10, 11 are connected by the skid 14 and the right-hand crosstubes 12, 13 are connected by the skid 15. The bow shaped crosstubes 10-13 have each an essentially circular radius of about 2.6 m or alternatively have each an elliptic bow shape. The distance between the skids 14, 15 in a landing position is from about 2 to 2.5 m.

Each of the left-hand crosstubes 10, 11 are vertically and horizontally supported and slidably guided along a longitudinal axis of the respective crosstube 10, 11 in pairwise laterally spaced supports 16-19 on the left-hand side and each of the right-hand crosstubes 12, 13 are vertically and horizontally supported and slidably guided along a longitudinal axis of the respective crosstube 12, 13 in pairwise laterally spaced supports 20-23 on the right-hand side. The supports 16-19 on the left-hand side are fixed to the main beams 5, 6 and the supports 20-23 on the right-hand side are fixed to the main beams 7, 8.

Each crosstube 10-13 has a length reaching in the landing position from the inner supports 18, 19 on the left-hand side and from the inner supports 20, 21 on the right-hand side to its respective extended position in the landing position with the geometry of the fuselage 4 being such that each of the crosstubes 10-13 can more or less be retracted entirely inside the fuselage 4, the retracted position of the crosstubes 10-13 being indicated with the dotted lines.

The crosstubes 10-13 are conveyed by respective drives 31 between the landing position and the retracted position. Each pair of crosstubes 10, 12 and 11, 13 may be provided with respectively one drive 31 exclusively engaging the respective crosstubes 10 and 11 while the opposed crosstubes 12 and 13 are symmetrically driven by means of a gears-unit (not shown) linked to the respective drives 31. Each of the crosstubes 10-13 may be provided with its own synchronized drive 31 for symmetrical movement of the crosstubes 10-13 between the landing position and the retracted position.

FIG. 3: The reference numbers of FIG. 1, 2 are used for the same features. The arrangement of crosstube 10 is shown as being representative of the other crosstubes 11-13. The cross section of the crosstube 10 is essentially circular. Crosstube 10 is passing through the supports 16, 18 with lateral flanges 26, 27. The crosstube 10 is supported on respective upper and lower rollers 24, in each of the supports 16, 18 allowing the movement of the crosstube 10 along its longitudinal axis relative to the supports 16, 18. Each of the rollers 24, 25 in the support 10 exert forces vertical to the respective longitudinal axis of the crosstube 10 and with the pair of the supports 16, 18 acting on each of the crosstubes 10-13 a cantilever effect is achieved for each of the crosstubes 10. The rollers 24, 25 are rotatably mounted in respective lateral flanges 26, 27 of the casing of each of the supports 16, 18. The roller 24 in each of the supports 16, 18 has a smaller diameter than roller 25. To correspond to the cantilever effect each pair of support 16, 18 on each of the crosstubes 10-13 are mounted with one support 16 being positioned upside down relative to the adjacent support 18. Each lateral flange 26, 27 is equipped with outwardly directed bearing studs 28, 29 for rotative mounting of the respective supports 16, 18 to the main beams 5, 6.

Pinions 30 of drives 31 with a motor-gears unit are in interacting engagement with a rack (not shown) mounted to of each of the crosstubes 10-13.

FIG. 4: The reference numbers of FIG. 1-3 are used for the same features. The supports 16-23 form essentially rectangular casings with the lateral flanges 26, 27 and the rollers 24, 25. The rollers 24, 25 in each of the supports 16-23 are shaped similar to a hyperboloid spool to guide the longitudinal movement of the crosstubes 10-13 relative to the supports 16-23. Roller 24 is mounted on ball supports 32, 33 carried by an axle 34 held in boreholes 35, 36 of the lateral flanges 26, 27 by first retention means 37, 38. Roller 25 opposite to roller 24 with respect to the crosstube 10-13 is mounted on ball supports 39, 40 carried by an axle 41 held in boreholes 42, 43 of the lateral flanges 26, 27 by second retention means 44, 45. Ball supports 39, 40 and axle 41 are of higher load capacity than ball supports 32, 33 and axle 34. A liner 46 is interposed between roller 24 and ball supports 32, 33 and a liner 47 is interposed between roller 25 and ball bearings 39, 40.

Bearing studs 28, 29 are outwardly directed from both lateral flanges 26, 27 for rotatable suspension of the supports 16-23 to the longitudinal main beams 5-8 of the bottom structure 3 of the fuselage 4 of helicopter 2.

Method of Operating a Skid-Type Landing Gear 1 of the Helicopter 2

In a landing position the skid-type landing gear 1 of the helicopter 2 is in the extended position. After take-off of the helicopter 2 the crosstubes 10-13 are unlocked and the at least one drive 31 is actuated by the pilot—or is operated automatically by an electronic control—in order to retract the four bow shaped crosstubes 10-13 with the respective skids 14, 15 at the outboard ends thereof from the landing position to the flight position with the skids 14, 15 being adjacent to the outer shell of the fuselage 4 (see FIG. 2) and abutting against the outer supports 16, 17 on the left-hand side and against the outer supports 22, 23 on the right-hand side of the helicopter 2. Two drives 31 are rotating their respectively synchronized pinions 30 in meshing engagement with the rack of the crosstube 10-13 for conveying the crosstubes 10-13 along the supports 16-23 inside the fuselage 4 into the retracted position For landing of the helicopter 2 the procedure is accomplished vice versa, i.e. the drive 31 is reversely actuated by the pilot—or is operated automatically by an electronic control—in order to drive the four bow shaped crosstubes 10-13 with the respective skids 14, 15 at the outboard ends thereof from the retracted position out of the fuselage 4 (see FIG. 2) back into the landing position. Once the crosstubes 10-13 have reached the landing position they are locked before landing.

What is claimed is:

1. A skid-type landing gear for a helicopter comprising at least two bow shaped crosstubes directed symmetrically towards a left- and a right-hand side of a longitudinal mid axis of the helicopter with respective skids at outboard ends thereof and main beams in a fuselage, the crosstubes being connected to the main beams via laterally spaced supports fixed to the main beams, wherein at least one crosstube is provided separately for each side of the helicopter, the crosstubes on either side being slidably mounted relative to the supports and in that at least one drive is provided for moving the at least one crosstube per side relative to the supports between a retracted and an extended position.

2. A skid-type landing gear according to claim 1, wherein the crosstubes have an essentially circular bow shape.

3. A skid-type landing gear according to claim 1, wherein the supports comprise rollers mounted in rotatable casings of the supports.

4. A skid-type landing gear according to claim 1, wherein the drive comprises an electric or hydraulic motor.

5. A skid-type landing gear according to claim 1, wherein the drive comprises a motor-gears unit with a pinion configured to interact with a rack mounted on the crosstubes.

6. A skid-type landing gear according to claim 1, wherein the crosstubes are lockable in the extended position.

7. A method of operating a skid-type landing gear according to claim 1 with the steps of retracting the at least two bow shaped crosstubes with the respective skids at outboard ends thereof after take-off from an extended position to a flight position and vice versa before landing from a flight position to an extended position.

8. A method according to claim 7, further comprising the step of locking the crosstubes at least in an extended position.

\* \* \* \* \*